(12) United States Patent
Endo et al.

(10) Patent No.: US 8,698,777 B2
(45) Date of Patent: Apr. 15, 2014

(54) MOUNT STRUCTURE OF TOUCH INPUT DEVICE HAVING PRESSURE SENSITIVE SENSOR

(75) Inventors: Yuko Endo, Kyoto (JP); Yuichiro Takai, Kyoto (JP); Yoshihiro Kai, Kyoto (JP); Takahiro Suzuki, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 205 days.

(21) Appl. No.: 13/498,384

(22) PCT Filed: Sep. 22, 2010

(86) PCT No.: PCT/JP2010/066349
§ 371 (c)(1),
(2), (4) Date: Mar. 27, 2012

(87) PCT Pub. No.: WO2011/040291
PCT Pub. Date: Apr. 7, 2011

(65) Prior Publication Data
US 2012/0182249 A1    Jul. 19, 2012

(30) Foreign Application Priority Data

Sep. 29, 2009  (JP) .................. 2009-224066

(51) Int. Cl.
G06F 3/041    (2006.01)
(52) U.S. Cl.
USPC ..................... 345/174; 345/156; 345/173
(58) Field of Classification Search
USPC .................................. 345/156, 173, 174
See application file for complete search history.

(56) References Cited

U.S. PATENT DOCUMENTS 5,714,694 A * 2/1998 Diessner .................. 73/862.632
5,854,625 A * 12/1998 Frisch et al. ................... 345/173
(Continued)

FOREIGN PATENT DOCUMENTS

| EP | 2 416 231 | 2/2012 |
|---|---|---|
| JP | 61-206020 | 9/1986 |

(Continued)

OTHER PUBLICATIONS

Supplementary European Search Report dated Jul. 5, 2013 in European Patent Application No. EP 10 82 0410.

(Continued)

*Primary Examiner* — David A Rogers
(74) *Attorney, Agent, or Firm* — Wenderoth, Lind & Ponack, L.L.P.

(57) ABSTRACT

[Subject] To provide a mount structure of a touch input device having a pressure sensitive sensor in which visibility can be prevented from being lowered even when the pressure sensitive sensor is mounted, water-proofness and dust-proofness are excellent, and a pressure can be easily detected with high measurement accuracy.
[Solution] According to a mount structure of a touch input device which includes a touch input device having at least a touch panel, and a pressure sensitive sensor attached to a lower surface thereof, and a casing dented to allow the device to be externally fitted in, and having a concave part or an opening part for a display device, and a frame-shaped support part to support a back surface peripheral part of the touch input device, in its bottom surface, the pressure sensitive sensor includes a pressure concentration member laminated and arranged in a dot shape so as to support the pressure sensitive ink member on a back surface, and a frame-shaped gasket is attached between the pressure sensitive sensor and the support part of the casing, in which the gasket does not overlap with the pressure concentration member.

12 Claims, 13 Drawing Sheets

(56) References Cited

U.S. PATENT DOCUMENTS

| | | | |
|---|---|---|---|
| 8,094,134 B2 | 1/2012 | Suzuki et al. | |
| 2002/0180710 A1* | 12/2002 | Roberts | 345/173 |
| 2004/0156168 A1* | 8/2004 | LeVasseur et al. | 361/681 |
| 2007/0040815 A1* | 2/2007 | Rosenberg et al. | 345/173 |
| 2007/0229464 A1* | 10/2007 | Hotelling et al. | 345/173 |
| 2008/0062122 A1* | 3/2008 | Rosenberg et al. | 345/156 |
| 2009/0243817 A1* | 10/2009 | Son | 340/407.2 |
| 2010/0156818 A1* | 6/2010 | Burrough et al. | 345/173 |
| 2010/0265208 A1* | 10/2010 | Kim et al. | 345/174 |
| 2011/0026202 A1 | 2/2011 | Kai et al. | |
| 2011/0255850 A1* | 10/2011 | Dinh et al. | 396/176 |
| 2012/0068965 A1* | 3/2012 | Wada et al. | 345/174 |
| 2012/0098767 A1* | 4/2012 | Takai et al. | 345/173 |
| 2012/0124491 A1* | 5/2012 | Hashimoto et al. | 715/761 |
| 2012/0126959 A1* | 5/2012 | Zarrabi et al. | 340/407.1 |
| 2012/0206248 A1* | 8/2012 | Biggs | 340/407.2 |
| 2012/0293450 A1* | 11/2012 | Dietz et al. | 345/174 |
| 2012/0299857 A1* | 11/2012 | Grant et al. | 345/173 |
| 2013/0044049 A1* | 2/2013 | Biggs et al. | 345/156 |
| 2013/0207793 A1* | 8/2013 | Weaber et al. | 340/407.2 |

FOREIGN PATENT DOCUMENTS

| | | |
|---|---|---|
| JP | 2002-48658 | 2/2002 |
| JP | 2009-176245 | 8/2009 |
| JP | 4642158 | 12/2009 |
| WO | 2007/091600 | 8/2007 |
| WO | 2009/084502 | 7/2009 |

OTHER PUBLICATIONS

International Search Report issued Jan. 11, 2011 in International (PCT) Application No. PCT/JP2010/066349.

International Preliminary Report on Patentability issued Apr. 12, 2012 in International (PCT) Application No. PCT/JP2010/066349.

* cited by examiner

MOUNT STRUCTURE OF TOUCH INPUT DEVICE HAVING PRESSURE SENSITIVE SENSOR

TECHNICAL FIELD

The present invention relates to a mount structure of a touch input device having a pressure sensitive sensor to measure a pressure in a direction vertical to a surface to which an external force is applied.

BACKGROUND ART

Conventionally, as a pressure sensitive sensor to measure a pressure of an external force (also referred to as pressed force) applied to a certain surface, there is a sensor as disclosed in a patent literature 1 (Japanese Unexamined Patent Publication No. 2002-48658). According to the sensor in the patent literature 1, plastic films each formed by laminating an electrode and a pressure sensitive ink layer in this order sandwich an insulating layer having bonding layers on its front and back surfaces in such a manner that their pressure sensitive ink members are opposed to each other. In addition, according to the sensor in the patent literature 1, since irregularities are provided on a surface of the pressure sensitive ink layer, a certain distance gap is formed between the upper and lower pressure sensitive ink layers, and the upper and lower pressure sensitive ink layers are prevented from being closely adhered to each other when a pressure is not applied.

According to the sensor having the above structure in the patent literature 1, when the pressed force is applied to the upper film, the electrode of the upper film corresponding to a part to which the pressure is applied due to the bending of the upper film is brought into contact with the electrode of the lower film through the pressure sensitive ink layer. Thus, both electrodes are conducted. According to the sensor in the patent literature 1, a pressure applied to the upper film can be measured by detecting the conducted state of both electrodes, and a fluctuation in resistance value based on the pressure applied to the pressure sensitive ink layer. When the sensor of the patent literature 1 is mounted, for example, inside a car sheet, it can be determined whether or not a passenger sits on the sheet, and a physical size of the passenger can be determined from a pressure distribution.

Recently, as for an electronic device having a touch panel, especially a portable electronic device such as a portable telephone or a game machine, a pressure sensitive sensor is required to be mounted on the touch panel of a display, for example, instead of an Enter button. In general, the portable electronic device is configured such that a display part of a display device positioned in a casing can be viewed through the touch panel. The sensor in the patent literature 1 is configured such that the electrodes and the pressure sensitive ink layer are arranged in large parts of the surfaces of the upper and lower films, so that transmittance (visibility) is low. Therefore, the sensor in the patent literature 1 cannot be applied to the electronic device having the touch panel as it is.

Thus, it is proposed by the applicants of the present invention that a pressure sensitive sensor which will be described below is attached to a lower surface of the touch panel to prevent visibility of the display part of the display device from being lowered even when the pressure sensitive sensor is mounted in the electronic device having the touch panel {Japanese Patent Application No. 2008-330284 (Japanese Examined Patent Publication No. 4642158}). That is, a pressure sensitive sensor 20 includes a lower film 22, an upper film 21 arranged so as to be opposed to the lower film 22, a pair of electrodes 21a and 22a arranged on opposed surfaces of the films, pressure sensitive ink members 23a and 23b arranged so as to be spaced from the pair of electrodes, and having electric characteristics changed by a pressed force applied, and a gap holding member 24 to bond the upper and lower films 21 and 22 and to hold a gap between the pressure sensitive ink members 23a and 23b and the pair of electrodes 21a and 22a, in which the pair of electrodes 21a and 22a are arranged in the shape of a frame along edge parts of the upper and lower films 21 and 22, and the pressure sensitive ink members 23a and 23b are dotted along the edge parts of the upper and lower films 21 and 22, and when the pressure sensitive sensor 20 is deformed due to an external force applied, at least one of them is brought into contact with the pair of electrodes 21a and 22a to conduct them (refer to FIG. 9).

In addition, according to the pressure sensitive sensor 20, a bump (projection) 26 is laminated and arranged on the back surface side of the lower film 22 just under the position of the pressure sensitive ink member, as a stress concentration member (refer to FIGS. 8 and 9). Thus, the pressure sensitive sensor 20 is attached on the lower surface of the touch panel and mounted in the casing, so that when a pressed force is applied to the pressure sensitive sensor 20 in a thickness direction, a part corresponding to the pressure sensitive ink member 23b of the lower film 22 is supported from below, and the pressed force applied can be surely transmitted as the force used for the deformation of the lower film 22 without being dispersed. Thus, pressure measurement accuracy can be improved.

Patent Literature 1:
Japanese Unexamined Patent Publication No. 2002-48658

SUMMARY OF INVENTION

Technical Problem

However, when the touch input device having the pressure sensitive sensor 20 shown in FIGS. 8 and 9 is mounted in the casing 2, anxiety is produced about water-proofness and dust-proofness because the bump 26 is provided on the back surface of the pressure sensitive sensor 20.

Thus, a frame-shaped gasket 140 formed of a soft material is arranged between the bump 26 and the casing 2 (refer to FIG. 24), so that the water-proofness and the dust-proofness are improved, but another problem is generated. That is, even when the pressed force is not applied to the pressure sensitive sensor 20 in the thickness direction, a pressure concentrates on the part corresponding to the pressure sensitive ink member of the lower film 22 (refer to FIG. 25), so that a resistance change as a detection value is poor even when the pressed force is actually applied to the pressure sensitive sensor 20 in the thickness direction. That is, it is difficult to detect the pressure.

Therefore, it is an object of the present invention to solve the problems and to provide a mount structure of a touch input device having a pressure sensitive sensor, in which visibility of a display part of a display device can be prevented from being lowered even when the pressure sensitive sensor is mounted, water-proofness and dust-proofness are excellent, and a pressure can be easily detected with high measurement accuracy.

Solution to Problem

The present invention provides a mount structure of a touch input device having a pressure sensitive sensor having the following configuration, in order to solve the technical problems.

According to a first aspect of the present invention, there is provided a mount structure of a touch input device comprising:

a touch input device having at least a touch panel, and a pressure sensitive sensor bonded to a lower surface of the touch panel; and a casing dented to have a level difference to allow the touch input device to be externally fitted in, and having a concave part or an opening part for a display device, and a frame-shaped support part to support a back surface peripheral part of the touch input device, in a bottom surface thereof, wherein the pressure sensitive sensor characterized by comprising:

a first substrate;

a second substrate arranged so as to be opposed to the first substrate and bonded to the lower surface of the touch panel;

a pair of frame-shaped electrodes arranged on one or both surfaces of a surface of the first substrate opposed to the second substrate and a surface of the second substrate opposed to the first substrate, along an edge part of the first or second substrate;

a conductive pressure sensitive ink member arranged on the surface of the first substrate opposed to the second substrate or the surface of the second substrate opposed to the first substrate so as to be apart from at least one of the pair of electrodes, and so as to be along the edge part of the first or second substrate, and having electric characteristics to be changed by a pressed force applied;

a gap holding member arranged in a region between the first substrate and the second substrate, to bond the first substrate and the second substrate with its adhesiveness, and hold a gap between the pressure sensitive ink member and at least one of the pair of electrodes; and a pressure concentration member laminated and arranged in a shape of a dot on a surface opposite to the surface opposed to the second substrate, of the first substrate so as to support the pressure sensitive ink member, wherein a frame-shaped gasket is attached between the pressure sensitive sensor and the support part of the casing, and the gasket does not overlap with the pressure concentration member.

According to a second aspect of the present invention, there is provided the mount structure of the touch input device having the pressure sensitive sensor, according to the first aspect, wherein the pressure sensitive ink members are arranged in the shape of dots along two longitudinal sides of the first substrate or the second substrate, and correspond one-to-one to the pressure concentration members.

According to a third aspect of the present invention, there is provided the mount structure of the touch input device having the pressure sensitive sensor, according to the first aspect, wherein the pressure sensitive ink members are arranged in a shape of a belt along two longitudinal sides of the first substrate or the second substrate.

According to a fourth aspect of the present invention, there is provided the mount structure of the touch input device having the pressure sensitive sensor, according to any one of the first to third aspects, wherein the frame-shaped gasket is provided with a through hole to house the pressure concentration member.

According to a fifth aspect of the present invention, there is provided the mount structure of the touch input device having the pressure sensitive sensor, according to the fourth aspect, wherein the through hole of the gasket houses two or more pressure concentration members.

According to a sixth aspect of the present invention, there is provided the mount structure of the touch input device having the pressure sensitive sensor, according to any one of the first to third aspects, wherein all of the pressure concentration members are positioned in a frame of the frame-shaped gasket.

According to a seventh aspect of the present invention, there is provided the mount structure of the touch input device having the pressure sensitive sensor, according to the sixth aspect, wherein an auxiliary member formed of a same material as that of the frame-shaped gasket is attached between the pressure sensitive sensor and the support part of the casing so as to position the pressure concentration member between the auxiliary member and the frame-shaped gasket.

According to an eighth aspect of the present invention, there is provided the mount structure of the touch input device having the pressure sensitive sensor, according to any one of the first to seventh aspects, wherein each of the first substrate, the second substrate, and the gap holding member is formed into a frame shape.

According to a ninth aspect of the present invention, there is provided the mount structure of the touch input device having the pressure sensitive sensor, according to any one of the first to seventh aspects, wherein each of the first substrate and the second substrate is formed into a flat plate with a transparent material, and a transparent window part is formed in a part except for the pair of electrodes.

According to a tenth aspect of the present invention, there is provided the mount structure of the touch input device having the pressure sensitive sensor, according to any one of the first to ninth aspects, wherein one of the pair of electrodes is arranged on the first substrate, the other of the pair of electrodes is arranged on the second substrate, and the pressure sensitive ink member is provided so as to cover a plurality of positions of the one or the other of the pair of electrodes.

According to an eleventh aspect of the present invention, there is provided the mount structure of the touch input device having the pressure sensitive sensor, according to any one of the first to ninth aspects, wherein the pair of electrodes is arranged on the first substrate so as to be spaced with each other, and the pressure sensitive ink member is arranged on the second substrate.

According to a twelfth aspect of the present invention, there is provided the mount structure of the touch input device having the pressure sensitive sensor, according to any one of the first to ninth aspects, wherein the pair of electrodes are arranged on the second substrate so as to be spaced to each other, and the pressure sensitive ink member is arranged on the first substrate.

Advantageous Effects of Invention

According to the mount structure of the touch input device having the pressure sensitive sensor in the present invention, since the pair of electrodes of the pressure sensitive sensor is arranged in the shape of the frame along the edge part of the first or second substrate, transmittance of the inner side part surrounded by that frame is not lowered. Therefore, when the display part of the display device is arranged inside the frame, the visibility of the display part can be prevented from being lowered.

In addition, the pressure concentration member is arranged on the side of the back surface of the pressure sensitive sensor just under the position of the pressure sensitive ink member, so that when the pressed force is applied to the pressure sensitive sensor in the thickness direction, the part corresponding to the pressure sensitive ink member of the lower film is supported from below, and the applied pressed force is not dispersed. Therefore, the pressure measurement accuracy can be improved.

In addition, the frame-shaped gasket is arranged between the pressure sensitive sensor and the support part of the casing, so that even when the lower surface of the pressure sensitive sensor is not flat due to the presence of the pressure concentration member, the space in the frame is sealed by the frame-shaped gasket. Therefore, excellent water-proofness and dust-proofness can be provided.

Furthermore, since the gasket does not overlap with the pressure concentration member, the pressure does not concentrate on the part corresponding to the pressure sensitive ink member of the lower film when the pressed force is not applied to the pressure sensitive sensor in the thickness direction, so that the pressure concentrates for the first time when the pressed force is actually applied to the pressure sensitive sensor in the thickness direction, and the resistance changes as the detection value becomes wide. Therefore, the pressure can be easily detected.

DESCRIPTION OF EMBODIMENTS

Hereinafter, best embodiments of the present invention will be described with reference to the drawings.

First Embodiment

According to a mount structure of a touch input device in a first embodiment of the present invention, a touch panel and a pressure sensitive sensor integrally configure a touch input device, and the touch input device having the pressure sensitive sensor is externally mounted in a casing. The touch input device in the first embodiment can detect a strength of a pressed force by the pressure sensitive sensor, in addition to position detection in the touch panel. The touch input device in the first embodiment appropriately functions as a touch input device of a display of an electronic device having a touch panel, especially a portable electronic device such as a mobile telephone or a game machine. Here, a description will be given of an example in which this touch input device is mounted on the portable telephone.

Figure 1:
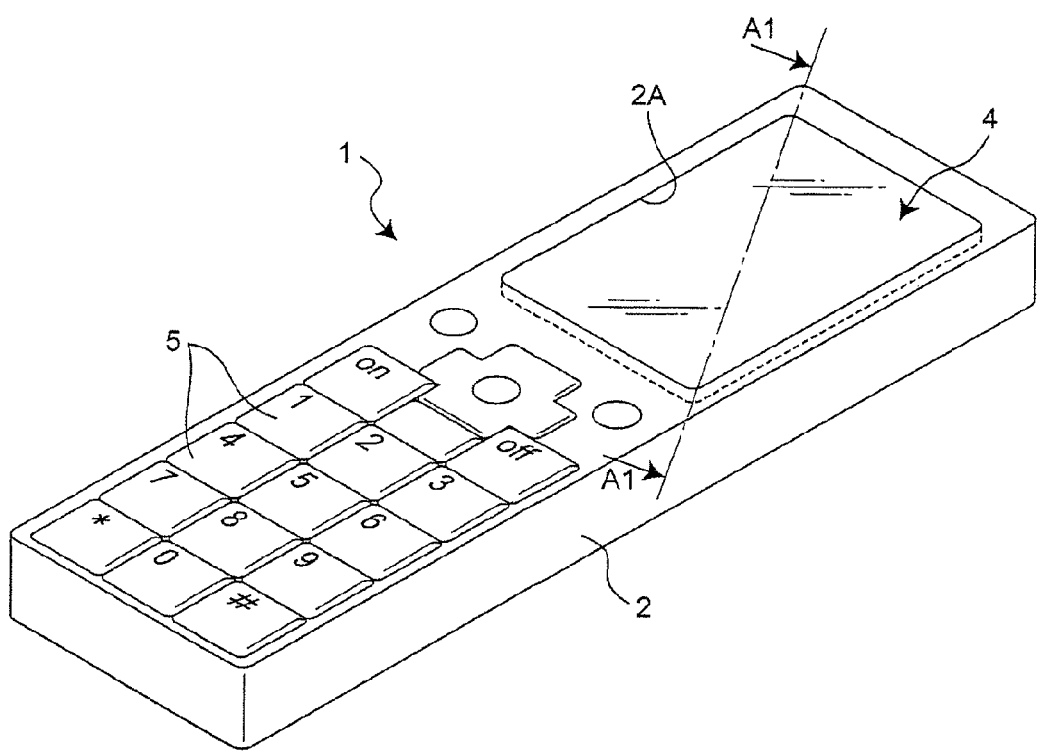
FIG. 1 is a perspective view of a portable telephone mounting a touch input device according to a first embodiment of the present invention.
Figure 2:
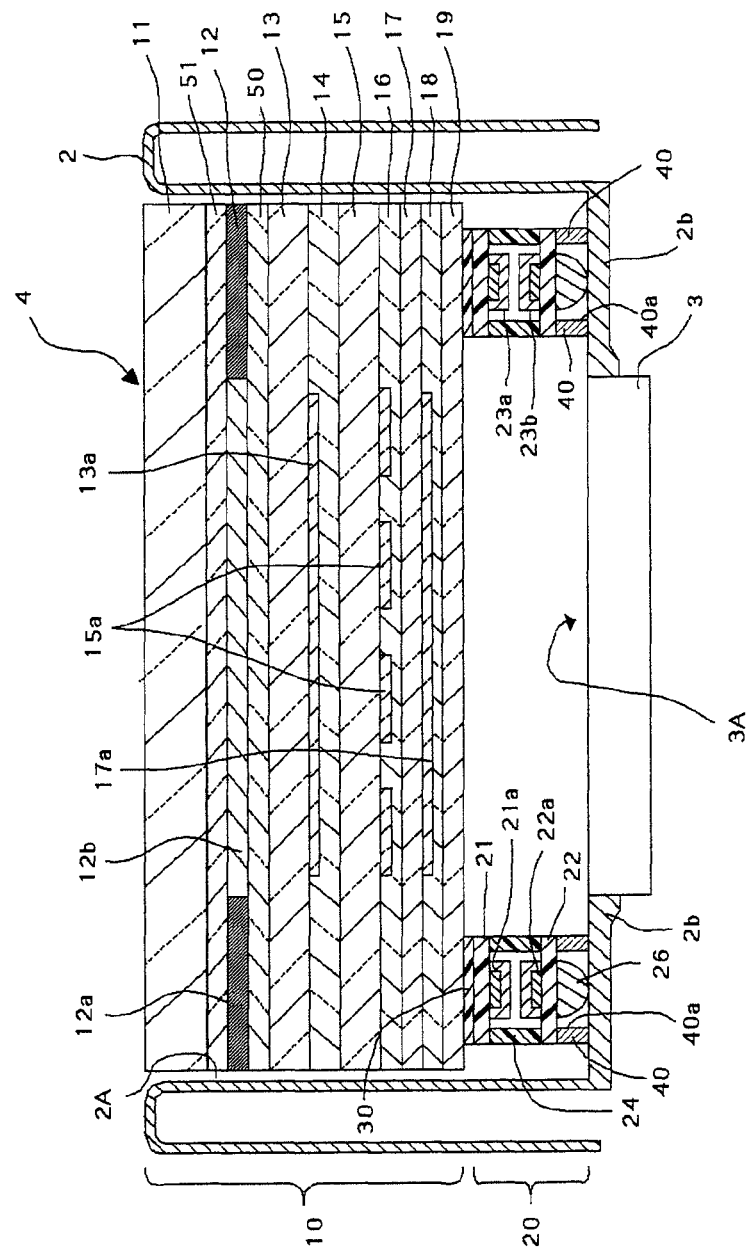
FIG. 2 is a cross-sectional view taken along a line A1-A1 in FIG. 1.
Figure 3:
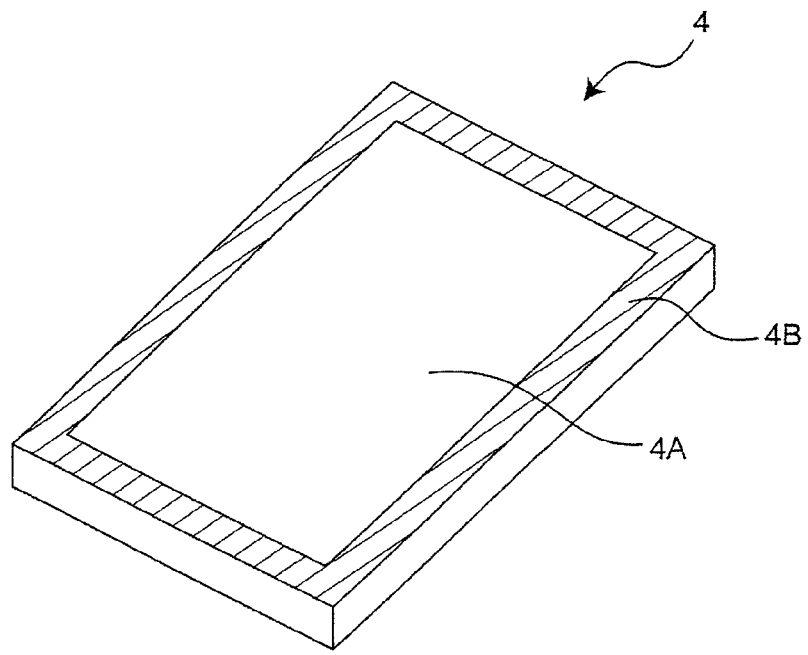
FIG. 3 is a perspective view of the touch input device according to the first embodiment of the present invention.

FIG. 1 is a perspective view of a portable telephone on which the touch input device according to this first embodiment is mounted, and FIG. 2 is a cross-sectional view taken along a line A1-A1 in FIG. 1. FIG. 3 is a perspective view of the touch input device.

As shown in FIG. 1, a portable telephone 1 includes a casing 2 made of a synthetic resin and having a display window 2A in its front surface, a display device 3 having a display part 3A such as a liquid crystal or organic EL, and incorporated in the casing 2, a touch input device 4 fit in the display window 2A, and a plurality of input keys 5 arranged on the front surface of the casing 2.

As shown in FIG. 3, the touch input device 4 has a transparent window part 4A, and a frame-shaped decorative region 4B arranged around the transparent window part 4A. After the touch input device 4 has been arranged in the display window 2A of the casing 2 of the portable telephone, the display part 3A of the display device 3 can be viewed from the transparent window part 4A.

In addition, the touch input device 4 includes a touch panel 10 to detect plane coordinates (XY coordinates) of an operation position, and a pressure sensitive sensor 20 to detect a strength of a pressed force applied to a direction (Z direction) perpendicular to an input surface, based on a touch operation to an input surface of the touch input device 4.

First, a configuration of the touch panel 10 will be described.

The touch panel 10 is a resistive type or capacitive type touch panel. Here, a description will be given of a case where the capacitive type touch panel is used as the touch panel 10. The touch panel 10 includes a transparent support substrate 11 serving as an input surface, a decorative film 12, an X detecting transparent film 13, a transparent adhesive layer 14, a Y axis detecting transparent film 15, a transparent adhesive layer 16, a shielding transparent film 17, a transparent adhesive layer 18, and a hard coat film 19 which are laminated in this order.

The transparent support substrate 11 is made of a material superior in transparency, rigidity, and processability such as glass, polymethylmethacrylate (PMMA) resin, or polycarbonate (PC) resin. The decorative film 12 is attached to a lower surface of the transparent support substrate 11 with a transparent adhesive agent 51.

The decorative film 12 is formed by applying ink in the shape of a frame on a surrounding surface of the transparent film. The decorative region 4B of the touch input device 4 is formed of a decorative part 12a to which the ink has been applied, and the transparent window part 4A of the touch input device 4 is a part 12b on which the decorative part 12a is not provided.

The ink for the decorative part 12a may be formed with colored ink containing a pigment or dye having an appropriate color as a coloring agent, and a binder including a resin such as a polyvinyl chloride based resin, polyamide based resin, polyester based resin, polyacrylic based resin, polyurethane based resin, polyvinyl acetal resin, polyester urethane based resin, cellulosic ester based resin, or alkyd resin. In addition, the decorative part 12a may be formed by printing instead of the coating. In the case where the decorative part 12a is formed by printing, a normal printing method such as offset printing, gravure printing, or screen printing may be used.

Figure 4:
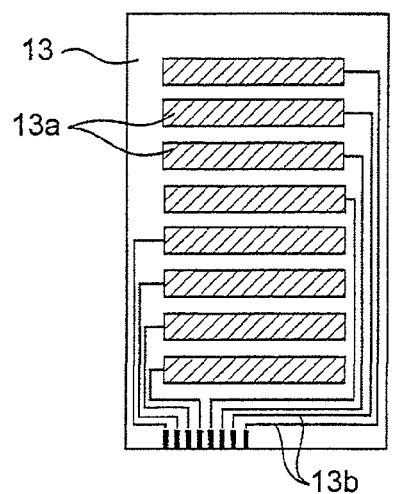
FIG. 4 is a plan view of an X axis detecting transparent film.

The X axis detecting transparent film 13 is bonded to a lower surface of the decorative film 12 with a transparent adhesive agent 50. As shown in FIG. 4, for example, an upper transparent electrode 13a arranged in the shape of a stripe in one direction, and a routing circuit 13b such as a bus bar or a routing line having a predetermined pattern to be electrically connected to an external part are formed on a lower surface of the X axis detecting transparent film 13. In addition, the transparent adhesive layer 14 is arranged on the lower surface of the X axis detecting transparent film 13 so as to cover the upper transparent electrode 13a and the routing circuit 13b, and the Y axis detecting transparent film 15 is attached with the transparent adhesive layer 14. The transparent adhesive layer 14 is a glue, bonding agent, or double-sided adhesive tape, for example.

Figure 5:
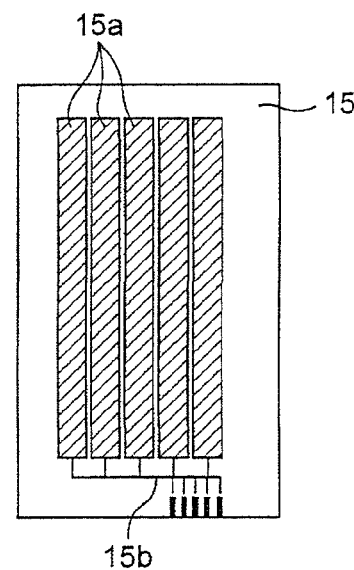
FIG. 5 is a plan view of a Y axis detecting transparent film.

As shown in FIG. 5, a lower transparent electrode 15a arranged in the shape of a stripe in a direction intersecting with (for example, perpendicular to) the upper transparent electrode 13a, and a routing circuit 15b such as a bus bar or a routing line having a predetermined pattern to be electrically connected to an external part are formed on a lower surface of the Y axis detecting transparent film 15. In addition, the transparent adhesive layer 16 is arranged on the lower surface of the Y axis detecting transparent film 15 so as to cover the lower transparent electrode 15a and the routing circuit 15b, and the shielding transparent film 17 is attached with the transparent adhesive layer 16. The transparent adhesive layer 16 is a glue, bonding agent, or double-sided adhesive tape, for example.

Figure 6:
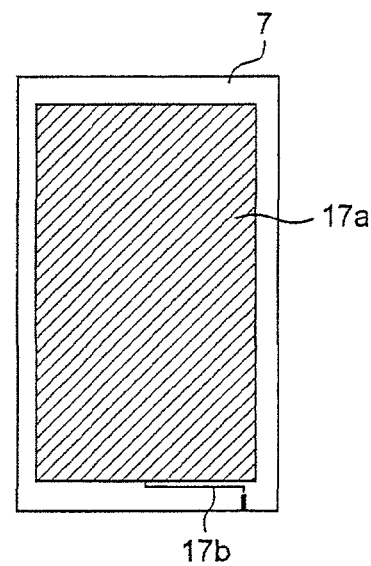
FIG. 6 is a plan view of a shielding transparent film.

As shown in FIG. 6, a rectangular shielding transparent electrode 17a, and a routing circuit 17b having a predetermined pattern to be connected to the casing 2 (grounded) are formed on a lower surface of the shielding transparent film 17. The shielding transparent electrode 17a is formed so as to be larger than the display part 3A of the display device 3, and arranged in a position so as to include the display part 3A when viewed from a thickness direction of the touch input device 4. Thus, the shielding transparent electrode 17a serves as an electromagnetic shield to shield a disturbing electromagnetic wave (AC noise) generated from the display device 3. In addition, the transparent adhesive layer 18 is arranged on a lower surface of the shielding transparent film 17 so as to cover the shielding transparent electrode 17a and the routing circuit 17b, and the hard coat film 19 is attached with the transparent adhesive layer 18. The transparent adhesive layer 18 is a glue, bonding agent, or double-sided adhesive tape.

The X axis detecting transparent film 13, the Y axis detecting transparent film 15, and the shielding transparent film 17 is made of a polyethylene terephthalate (PET) resin, or a polycarbonate (PC) resin. The hard coat film 19 is made of a polyethylene terephthalate (PET) resin, or polyimide.

Each of the transparent electrodes 13a, 15a, and 17a, and each of the routing circuits 13b, 15b, and 17b is formed of a transparent conductive film. A material of the transparent conductive film includes a thin film of a metal oxide such as a tin oxide, indium oxide, antimony oxide, zinc oxide, cadmium oxide, or ITO; or a conductive polymer. Each of the transparent electrodes 13a, 15a, and 17a, and each of the routing circuits 13b, 15b, and 17b are formed in such a manner that a conductive coating film is formed on an entire surface of each of the transparent films 13, 15, and 17 by a method such as vacuum vapor deposition, sputtering, ion plating, CVD, or roll coating, and then an unnecessary part is removed by etching. The etching is performed such that after a resist has been formed on the part which is to be left as the electrode by a photolithography method or a screen method, the film is dipped in an etching solution such as hydrochloric acid. In addition, the etching can be performed such that after the resist has been formed, the conductive coating film of the part not having the resist is removed by spraying the etching solution, and then the resist is dipped in a solvent, so that the resist is swelled or dissolved and removed. In addition, the etching may be performed by laser.

Next, a configuration of the casing 2 will be described.

As shown in FIG. 2, the display window 2A of the casing 2 is dented so as to have a level difference to allow the touch input device 4 having the pressure sensitive sensor 20 to be externally fitted therein. An opening part 2a is formed in a bottom surface of the display window 2A such that the display part 3A of the display device 3 can be viewed. The touch input device 4 having the pressure sensitive sensor 20 is supported by a frame-shaped support part 2b provided around the opening part 2a, and closes the opening part 2a. In addition, instead of the opening part 2a, a concave part which can house the display device 3 may be provided.

In addition, a shape or a size of the display window 2A can be variously changed according to a shape or a size of the touch input device 4. A level difference of the display window 2A can be variously changed according to a thickness etc. of the touch input device 4 having the pressure sensitive sensor 20. A shape or a size of the opening part 2a of the display window 2A can be variously changed according to a shape or a size of the display part 3A. Here, the display window 2A, the opening part 2a, the display part 3A, and the touch input device 4 having the pressure sensitive sensor 20 are rectangular in shape, and the level difference of the display window 2A is set such that a surface of the casing 2 is at the same level as a surface of the touch input device 4 having the pressure sensitive sensor 20.

Next, a configuration of the pressure sensitive sensor 20 will be described.

Figure 7:
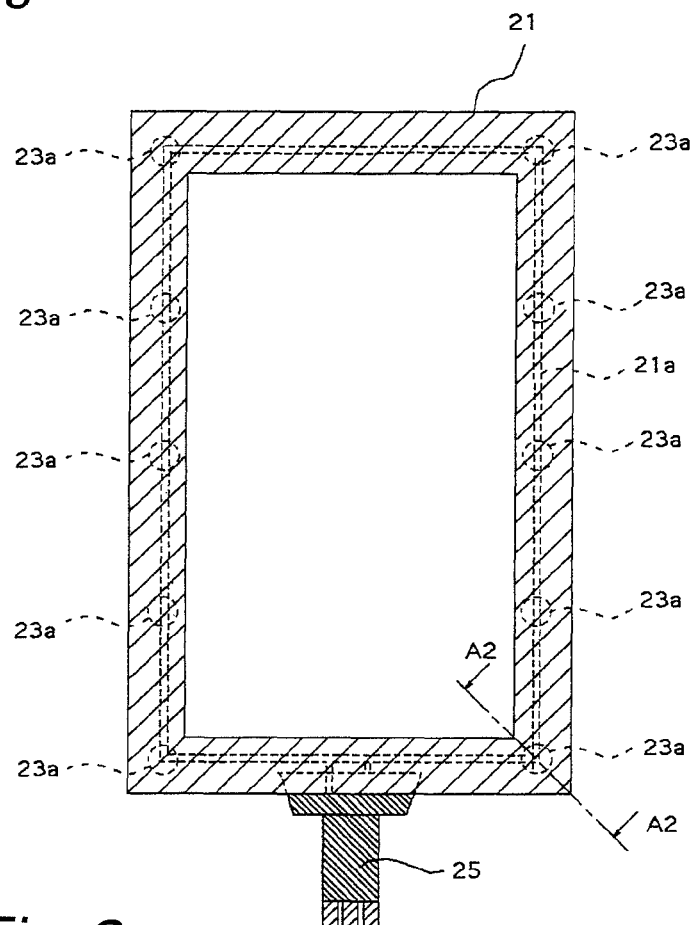
FIG. 7 is a plan view of a pressure sensitive sensor provided in the touch input device.
Figure 8:
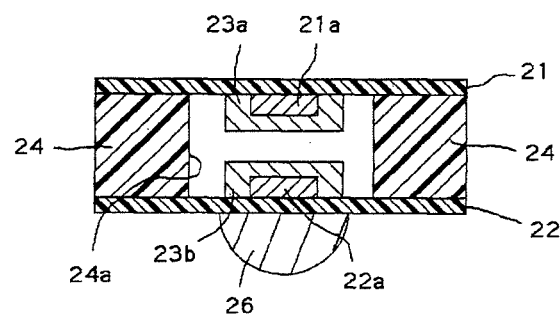
FIG. 8 is a cross-sectional view taken along a line A2-A2 in FIG. 7.
Figure 9:
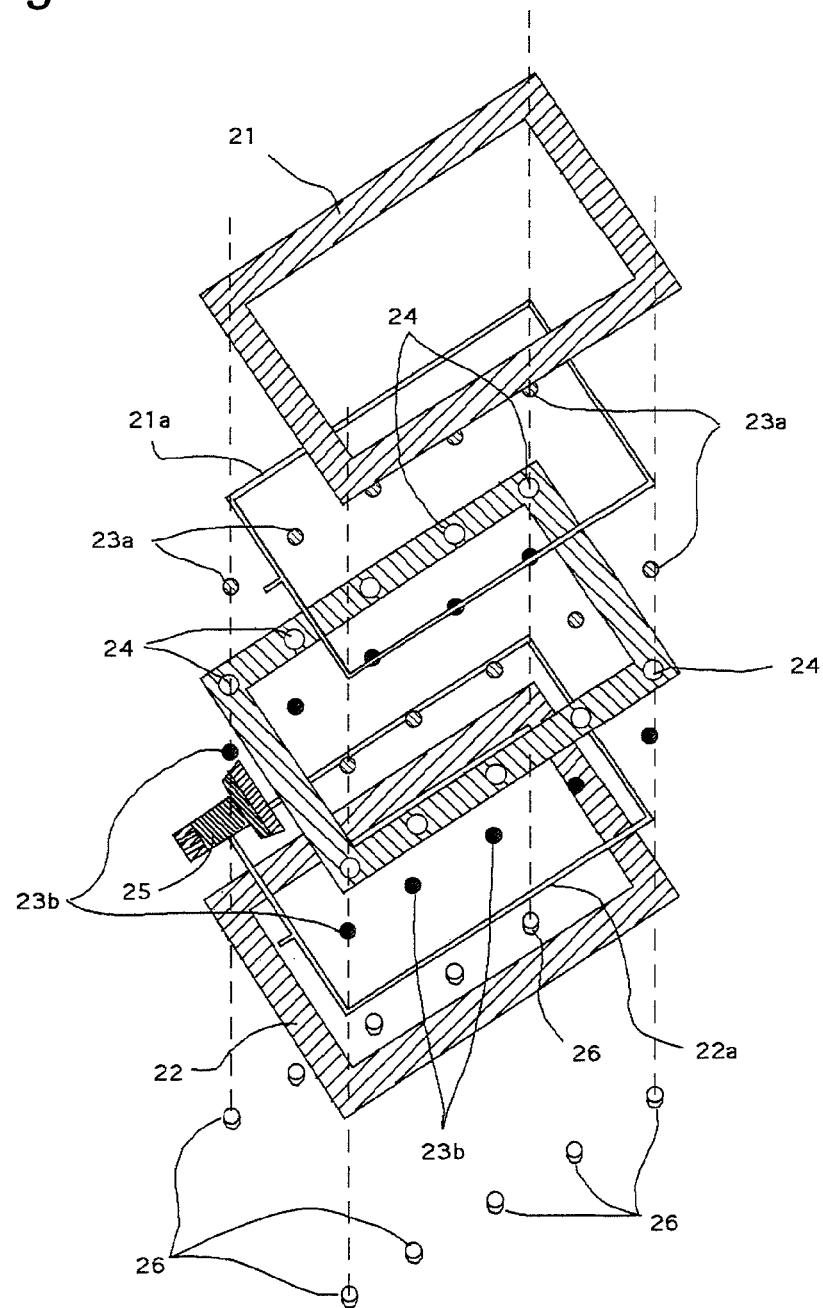
FIG. 9 is an exploded perspective view of the pressure sensitive sensor shown in FIG. 7.

FIG. 7 is a plan view of the pressure sensitive sensor according to this first embodiment, and FIG. 8 is a cross-sectional view taken along a line A2-A2 in FIG. 7. FIG. 9 is an exploded perspective view of the pressure sensitive sensor shown in FIG. 7.

The pressure sensitive sensor 20 is attached to a lower surface of the hard coat film 19 of the touch panel 10 by an adhesive layer 30 such as a glue, bonding agent, double-sided adhesive tape, or the like for example. The pressure sensitive sensor 20 is formed into a frame shape so as to be hidden by the decorative part 12a when viewed from the above of the touch panel 10. Therefore, a material of each member for the pressure sensitive sensor 20 is not limited to a transparent material, and may be a colored material.

The pressure sensitive sensor 20 includes an upper film 21 serving as one example of a second frame-shaped substrate, and a lower film 22 serving as one example of a first frame-shaped substrate arranged so as to be opposed to the upper film 21. The pressure sensitive sensor 20 is attached to the display window 2A by attaching the lower film 22 to the frame-shaped part 2b of the display window 2A, for example, with an adhesive agent. A thickness of each of the upper and lower films 21 and 22 is set to 25 µm to 100 µm, for example.

A material for the upper and lower films 21 and 22 includes materials which are available for a flexible substrate, that is, general-purpose resins such as polyethylene terephthalate, polystyrene based resin, polyolefin based resin, ABS resin, AS resin, acrylic based resin, or AN resin. In addition, the material may be a general-purpose engineering resin such as a polystyrene based resin, polycarbonate based resin, polyacetal based resin, polycarbonate modified polyphenylene ether resin, polybutylene terephthalate resin, or ultrahigh molecular weight polyethylene resin; or a super engineering resin such as a polysulfone resin, polyphenylene sulfide based resin, polyphenylene oxide based resin, polyarylate resin, polyether imide resin, polyimide resin, liquid crystal polyester resin, or polyallyl based heat resistance resin.

An upper electrode 21a is arranged in the shape of a frame on a surface of the upper film 21 which is opposed to the lower film 22. A lower electrode 22a is arranged in the shape of a frame on a surface of the lower film 22 which is opposed to the upper film 21, so as to be opposed to the upper electrode 21a. Here, a pair of electrodes is formed by the upper electrode 21a and the lower electrode 22a. A thickness of each of the upper and lower electrodes 21a and 22a is set to 10 µm to 20 µm, for example.

A material for the upper and lower electrodes 21a and 22a includes a metal such as gold, silver, copper, or nickel; or a paste having conductivity such as carbon. They are formed by a printing method such as screen printing, offset printing; gravure printing, or flexographic printing, or a photoresist method. In addition, the upper and lower electrodes 21a and 22a may be formed by attaching metal foil such as copper or gold. Furthermore, the upper and lower electrodes 21a and 22a may be formed in such a manner that an electrode pattern is formed with a resist on a FPC plated with a metal such as copper, and a metal foil is removed from a part which is not protected by the resist by etching.

Dot-shaped upper pressure sensitive ink members 23a are arranged so as to cover the upper electrode 21a along two longitudinal sides of the upper film 21. Dot-shaped lower pressure sensitive ink members 23b are arranged so as to cover the lower electrode 22a and be opposed to the upper pressure sensitive ink members 23a, along the two longitudinal sides of the lower film 22. A thickness of the upper or lower pressure sensitive ink members 23a or 23b (height from the upper film 21 or lower film 22) is larger than a thickness of the upper or lower electrode 21a or 22a, and is set to 15 µm to 35 µm, for example.

The upper and lower pressure sensitive ink members 23a and 23b are made of a material whose electric characteristics such as an electric resistance value to be changed by an external force. As their composition, a quantum tunneling composite material which is available by a product name of "QTC" from Peratech Limited in England may be used. The upper pressure sensitive ink member 23a and the lower pressure sensitive ink member 23b can be arranged on the upper film 21 and the lower film 22, respectively by coating. A coating method of the upper and lower pressure sensitive ink members 23a and 23b includes a printing method such as screen printing, offset printing, gravure printing, or flexographic printing.

A frame-shaped gap holding member 24 is arranged in a region between the upper film 21 and the lower film 22. The gap holding member 24 has adhesiveness to bond the upper film 21 and the lower film 22, and serves as an insulating member to hold a gap between the upper pressure sensitive ink member 23a and the lower pressure sensitive ink member 23b. The gap holding member 24 is a double-sided adhesive tape formed such that an adhesive agent such as acrylic based bonding glue is formed on both surfaces of a core material such as a polyethylene terephthalate film. A thickness of the gap holding member 24 is set to 50 to 100 µm, for example.

As shown in FIG. 9, through holes 24a are provided in the gap holding member 24 so as to correspond to the upper and lower pressure sensitive ink members 23a and 23b. Each through hole 24a has a width (diameter in an example shown in FIG. 9) larger than those of the upper and lower pressure sensitive ink members 23a and 23b. For example, the width of the through hole 24a is 3 mm, the width of each of the upper and lower pressure sensitive ink members 23a and 23b is 2 mm, and a width of each of the upper and lower electrodes 21a and 22a is 1 mm. Thus, the gap holding member 24 and the pressure sensitive ink members 23a and 23b are not brought into contact with each other. In addition, since the gap holding member 24 covers the upper and lower electrodes 21a and 22a except for the through hole 24a, the electrodes 21a and 22a are prevented from being electrically connected except for a part corresponding to the through hole 24a.

In addition, the upper and lower electrodes 21a and 22a are connected to a connector 25. The connector 25 is connected to a pressed force detecting part (not shown) incorporated in the portable telephone 1.

According to the pressure sensitive sensor 20 having the above constitution, the upper pressure sensitive ink member 23a and the lower pressure sensitive ink member 23b are not in contact with each other by the gap holding member 24 at a normal time (pressure is not applied). In this state, when a pressed force is applied to a touch input surface of the touch panel 10 provided on the pressure sensitive sensor 20, the upper or lower film 21 or 22 is bent and deformed by the pressed force, and the upper and lower pressure sensitive ink members 23a and 23b are brought into contact with each other. Thus, a current flows between the upper electrode 21a and the lower electrode 22a. The pressed force to the input surface of the touch input device 4 can be detected by detecting this current.

In addition, as the pressed force to the touch input surface of the touch input device 4 increases, external force transmitted to the upper and lower pressure sensitive ink members 23a and 23b increases, which causes a decrease in electric resistance values of the upper and lower pressure sensitive ink members 23a and 23b. Thus, the current flowing between the upper electrode 21a and the lower electrode 22a increases. When the change of this current is converted to a voltage value and detected, the external force applied to the upper or the lower pressure sensitive ink members 23a or 23b can be detected, and the pressed force to the touch input surface of the touch input device 4 can be detected.

Figure 11:
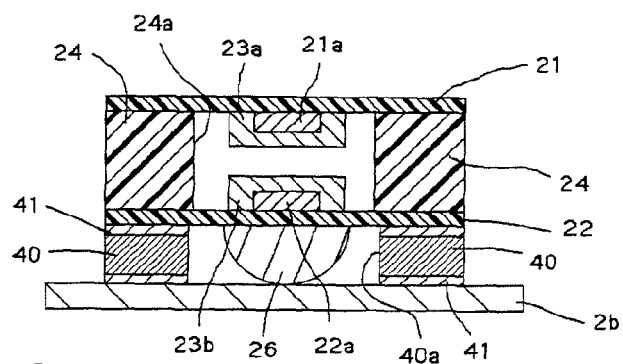
FIG. 11 is an enlarged cross-sectional view of a main part of a mount structure of a touch input device using the gasket shown in FIG. 10.
Figure 12:
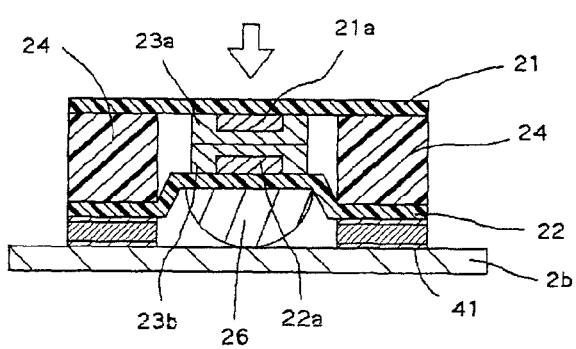
FIG. 12 is an enlarged cross-sectional view of a main part of the mount structure of the touch input device shown in FIG. 11 at the time of pressing.

In addition, as shown in FIGS. 8 and 9, the pressure sensitive sensor 20 is configured such that a bump 26 is laminated as a pressure concentration member on a surface (back surface) not having the lower electrode 22a, of the lower film 22. In addition, in FIG. 9, the pressure sensitive ink members 23a and 23b correspond one-to-one with the bump 26. Here, a height of the bump 26 is 50 μm to 200 μm (including a thickness of a bonding layer to be bonded to the lower film 22), for example. Thus, as shown in FIGS. 11 and 12, when the pressed force is applied to the pressure sensitive sensor 20 in a thickness direction, the part of the pressure sensitive ink member 23b of the lower film 22 is supported from below, and the pressed force applied can be surely transmitted as the force used for the deformation of the lower film 22 without being dispersed. Thus, pressure measurement accuracy can be improved. In addition, the lower film 21 can be easily deformed, and the pressure measurement accuracy can be improved in the case where the gap holding member 24 is not in contact with the upper or lower pressure sensitive ink member 23a or 23b.

In addition, it is preferable that a width (diameter in the example shown in FIG. 9) of the bump 26 is larger than the width (diameter in the example shown in FIG. 9) of each of the upper and lower pressure sensitive ink members 23a and 23b in view of durability of the upper and lower pressure sensitive ink members 23a and 23b. When the width of the bump 26 is smaller than the width of each of the upper and lower pressure sensitive ink members 23a and 23b, the lower film 22 is largely deformed in a part corresponding to an outer edge of the bump 26, so that the upper pressure sensitive ink member 23a is also deformed in the part corresponding to the outer edge of the bump 26, and comes in contact with the lower pressure sensitive ink member 23b. When this is repeated, the problem may be that the resistance of the upper and lower pressure sensitive ink members 23a and 23b becomes high.

In addition, the pressure concentration member is not limited to the bump, and the pressure concentration member may be a member having high compressibility. In addition, the pressure concentration member 26 is hemispherical in shape in the figure, but the pressure concentration member 26 may have a shape of a rectangular parallelepiped. When the pressure concentration member 26 is in the shape of the rectangular parallelepiped, a variation in measurement sensitivity is small compared to the case where the pressure is received by a point like the hemispherical configuration. A material of the pressure concentration member includes ink or film formed of an epoxy resin or acrylic resin.

Finally, a configuration of a gasket 40 will be described.

Figure 10:
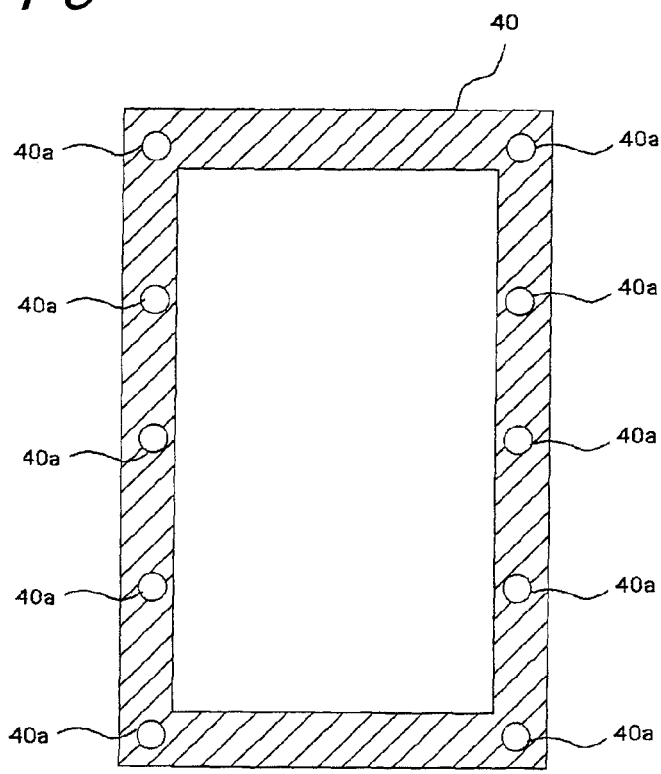
FIG. 10 is a plan view of a gasket according to the first embodiment of the present invention.

FIG. 10 is a plan view of a gasket according to this first embodiment, and FIG. 11 is an enlarged cross-sectional view of a main part of a mount structure of a touch input device using the gasket shown in FIG. 10.

Both surfaces of the gasket 40 are bonded to the pressure sensitive sensor 20 and the support part 2b of the casing 2 by an adhesive layer 41 such as a glue, bonding agent, or double-sided adhesive tape (not shown in FIG. 2). The gasket 40 is used to seal a space in the frame to avoid liquid or dust. When the gasket 40 is not provided, the lower surface of the pressure sensitive sensor 20 is not flat due to the bump 26, and there is a gap between the pressure sensitive sensor 20 and the support part 2b of the casing 2, so that liquid or dust externally invades and could affect performance of the electronic device.

A material of the gasket 40 is not limited in particular, but it includes various kinds of rubbers such as a natural rubber, isoprene rubber, butyl rubber, butadiene rubber, styrene-butadiene rubber, or silicone rubber; especially vulcanized rubber; a styrene based elastomer such as hydrogenated styrene-butadiene copolymer, or hydrogenated styrene-ethylene-butylene-styrene block copolymer; an olefin based elastomer such as ethylene-α-olefin copolymer or propylene-α-olefin copolymer; various kinds of thermoplastic elastomers such as polyurethane based elastomer or polyamide based elastomer; or a mixture of those. In addition, a foamed material such as foamed urethane or foamed olefin having a high density may be used for the material of the gasket 40.

As shown in FIGS. 10 to 12, a through hole 40a to house the bump 26 serving as the pressure concentration member is provided in the gasket 40 with respect to each pressure concentration member. Since the gasket 40 does not overlap with the bump 26 serving as the pressure concentration member due to the through hole 40a, a pressure does not concentrate on a part corresponding to the pressure sensitive ink members 23a and 23b of the lower film 22 when the pressed force is not applied to the pressure sensitive sensor 20 in the thickness direction (Refer to FIG. 11), and when the pressed force is actually applied the pressure sensitive sensor 20 in the thickness direction (refer to FIG. 12), the pressure concentrates for the first time, and the change in resistance as the detection value becomes wide.

A width of the through hole 40a of the gasket 40 is preferably the same as the width of the through hole 24a of the gap holding member 24, or larger than the width of the through hole 24a of the gap holding member 24. For example, when the width of the through hole 24a of the gap holding member 24 is 3 mm, the width of the through hole 40a of the gasket 20 is 3.5 mm. Thus, when the pressed force is applied to the pressure sensitive sensor 20 in the thickness direction, the lower film 21 of the pressure sensitive sensor 20 is likely to be deformed, and thus, the pressure measurement accuracy can be improved.

As described above, according to the mount structure of the touch input device having the pressure sensitive sensor in this first embodiment of the present invention, since the upper and lower electrodes 21a and 22a of the pressure sensitive sensor 20 are arranged in the shape of the frame, a transmittance of the inner side part surrounded by the frame is not lowered. Therefore, when the display part 3A of the display device 3 is arranged inside the frame even in the portable telephone 1 having the touch panel 10, the visibility of the display part 3A can be prevented from being lowered.

In addition, the pressure sensitive ink members 23a and 23b are dotted along the two longitudinal sides of the upper and lower films 21 and 22, respectively, so that in a case where the same pressed force is applied to the upper film 21, respective contact areas between the upper and lower pressure sensitive ink members 23a and 23b, and the upper and lower electrodes 21a and 22a can be prevented from being varied. Therefore, the pressure measurement accuracy can be improved.

Figure 13:
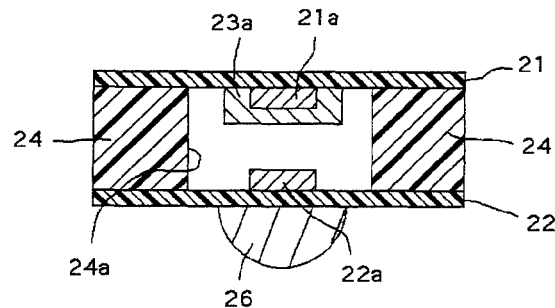
FIG. 13 is a cross-sectional view showing a variation of a pressure sensitive sensor provided in the touch input device according to the first embodiment of the present invention.

In addition, the present invention is not limited to the above embodiment, and can be implemented in other various manners. For example, the upper and lower electrodes 21a and 22a are covered with the upper and lower pressure sensitive ink members 23a and 23b, respectively in the first embodiment, but the present invention is not limited to this. For example, as shown in FIG. 13, the upper electrode 21a is covered with the upper pressure sensitive ink member 23a, but the lower electrode 22a may not be covered with the lower pressure sensitive ink member 23b. That is, at least one of the upper and lower electrodes 21a and 22a only has to be covered with the pressure sensitive ink member. In this case, only one pressure sensitive ink member is arranged between the upper electrode 21a and the lower electrode 22a, so that the measurement accuracy and measurement sensitivity of the pressure can be higher than those when the two pressure sensitive ink members are arranged. In addition, in the case where the upper and lower electrodes 21a and 22a are covered with the upper and lower pressure sensitive ink members 23a and 23b, respectively like the first embodiment, exposed parts of the upper and lower electrodes 21a and 22a can be small in the through hole 24a. Thus, a defect such as corrosion can be prevented from being generated in the upper and lower electrodes 21a and 22a.

Figure 16:
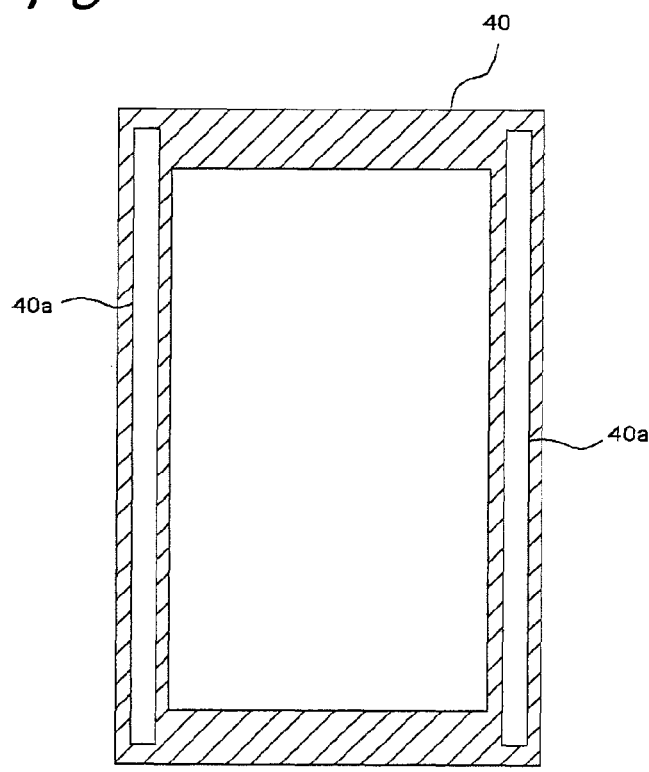
FIG. 16 is an explanatory view showing a variation of the pressure sensitive sensor provided in the touch input device according to the first embodiment of the present invention.

In addition, the upper and lower pressure sensitive ink members 23a and 23b are arranged so as to be dotted along the two longitudinal sides of the upper and lower films 21 and 22 in the first embodiment (refer to FIG. 9), but the present invention is not limited to this. For example, the upper and lower pressure sensitive ink members 23a and 23b only has to be arranged along the edges of the upper and lower films 21 and 22, respectively, and may be arranged in each corner part (refer to FIG. 16). In addition, in the case where the upper and the lower pressure sensitive ink members 23a and 23b are dotted along the two longitudinal sides, the upper and the lower pressure sensitive ink members 23a and 23b are preferably arranged bilaterally symmetrically at regular intervals.

Figure 17:
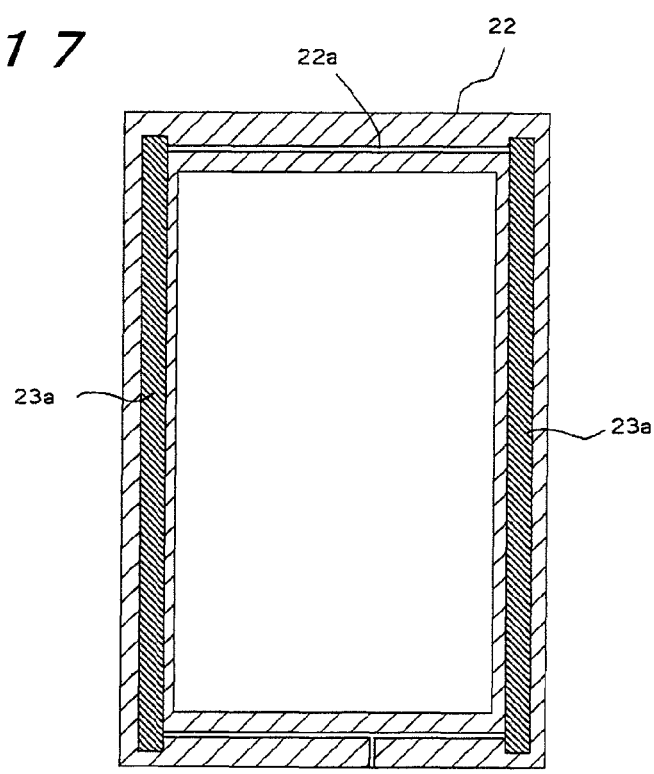
FIG. 17 is an explanatory view showing a variation of the pressure sensitive sensor provided in the touch input device according to the first embodiment of the present invention.
Figure 18:
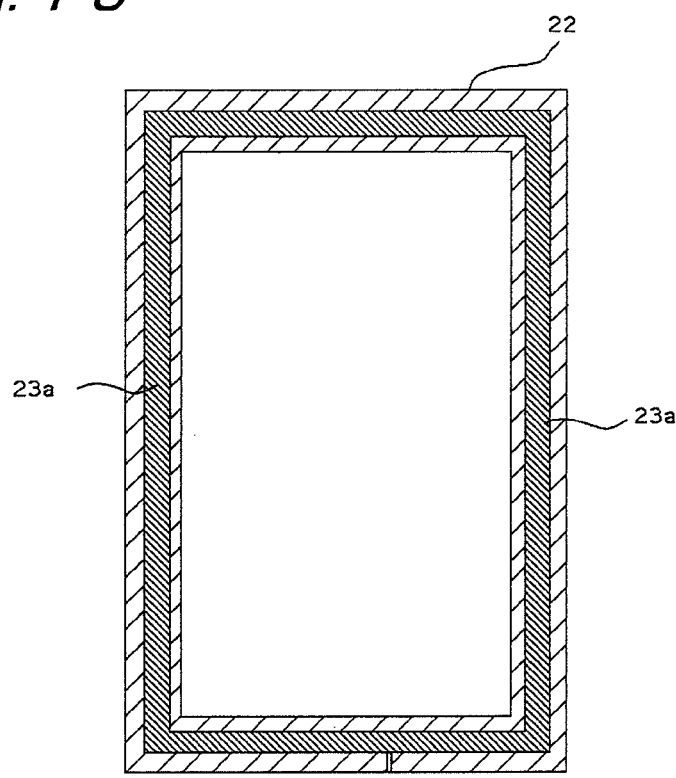
FIG. 18 is an explanatory view showing a variation of the pressure sensitive sensor provided in the touch input device according to the first embodiment of the present invention.

In addition, as shown in FIG. 17, the pressure sensitive ink members 23a and 23b may be arranged in the shape of a belt along the two longitudinal sides of the upper and lower films 21 and 22, respectively. Furthermore, as shown in FIG. 18, the pressure sensitive ink members 23a and 23b may be arranged in the shape of a frame in the upper and lower films 21 and 22, respectively. In these cases, each of the pressure sensitive ink members 23a and 23b corresponds one-to-plural to the bumps 26, but the pressure sensitive ink members 23a and 23b provided in the part not having the bump 26 is not substantially involved in the pressure detection. In addition, positional accuracy is allowed to be low in the case where the pressure sensitive ink members 23a and 23b are formed into the belt shape or the frame shape, compared to the case where the pressure sensitive ink members 23a and 23b are formed into a dot shape, so that pressure sensitive ink can be easily printed.

Figure 14:
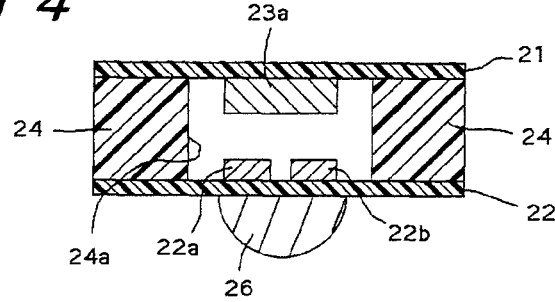
FIG. 14 is a cross-sectional view showing a variation of the pressure sensitive sensor provided in the touch input device according to the first embodiment of the present invention.

In addition, the pair of electrodes is composed of the upper electrode 21a and the lower electrode 22a in the pressure sensitive sensor 20 in the first embodiment, but instead of the upper electrode 21a, a frame-shaped lower electrode 22b may be arranged on the lower film 22 parallel to the lower electrode 22a (refer to FIG. 14). That is, when the pressed force is applied to the pressure sensitive sensor in the thickness direction, the upper pressure sensitive ink member 23a of the upper film 21 (for example, in a case where the upper pressure sensitive ink members 23a are arranged in ten positions along the two longitudinal sides of the upper film 21 as shown in FIG. 9, at least one of the ten positions) comes in contact with each of the lower electrode 22a and the lower electrode 22b to conduct them. Thus, the external force applied to the pressure sensitive ink member 23a can be detected, and the pressed force to the touch input surface can be detected. In addition, a frame-shaped electrode may be arranged in parallel on the side of the upper film 21 instead of the side of the lower film 22.

Figure 15:
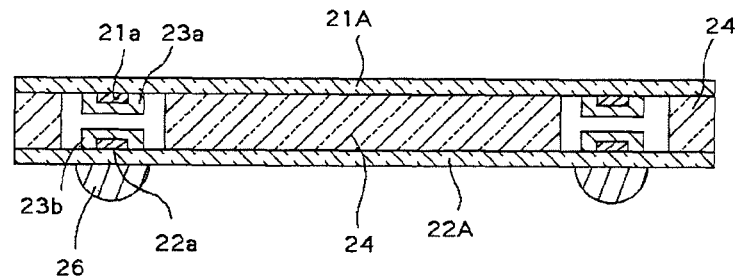
FIG. 15 is a cross-sectional view showing a variation of the pressure sensitive sensor provided in the touch input device according to the first embodiment of the present invention.

In addition, the upper and the lower films 21 and are formed into the frame shape in the pressure sensitive sensor 20, in the first embodiment, but instead of the frame-shaped upper and lower films 21 and 22, upper and lower films 21A and 22A may be formed into a rectangular shape, and the upper and lower films 21A and 22A, and the gap holding member 24 may be made of a transparent material (refer to FIG. 15). In addition, since the upper and lower electrodes 21a and 22a are arranged in the shape of the frame, the transmittance in the inner side part surrounded by the frame is not lowered. In addition, since the upper and lower films 21A and 22A, and the gap holding member 24 are made of the transparent material, the transmittance can be prevented from being lowered. Therefore, even when the upper and lower films 21A and 22A, and the gap holding member 24 are mounted in the portable telephone 1 having the touch panel 10, the visibility of the display part 3A of the display device 3 can be prevented from being lowered.

Figure 19:
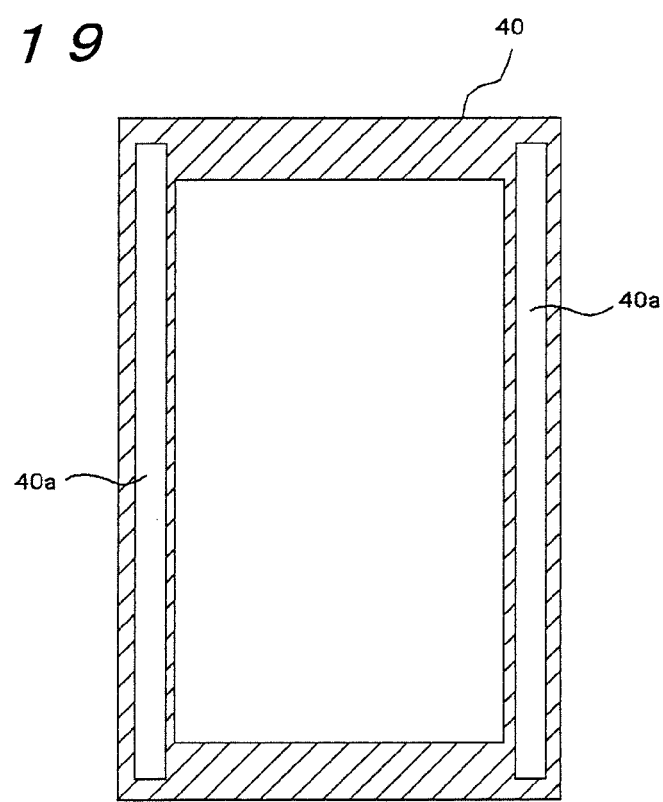
FIG. 19 is an explanatory view showing a mount variation of the touch input device according to the first embodiment of the present invention.

In addition, the through hole 40a of the gasket 40 is provided with respect to each pressure concentration member 26 in the first embodiment, but instead of this, the through hole 40a of the gasket 40 may house two or more pressure concentration members 26 (refer to FIG. 19). When the through hole 40a is provided so as to house two or more pressure concentration members 26, the through hole 40a can be easily formed, that is, the gasket 40 can be easily processed.

In addition, the decorative film 12 is provided in the first embodiment, but the decorative film 12 may not be provided.

Second Embodiment

Figure 20:
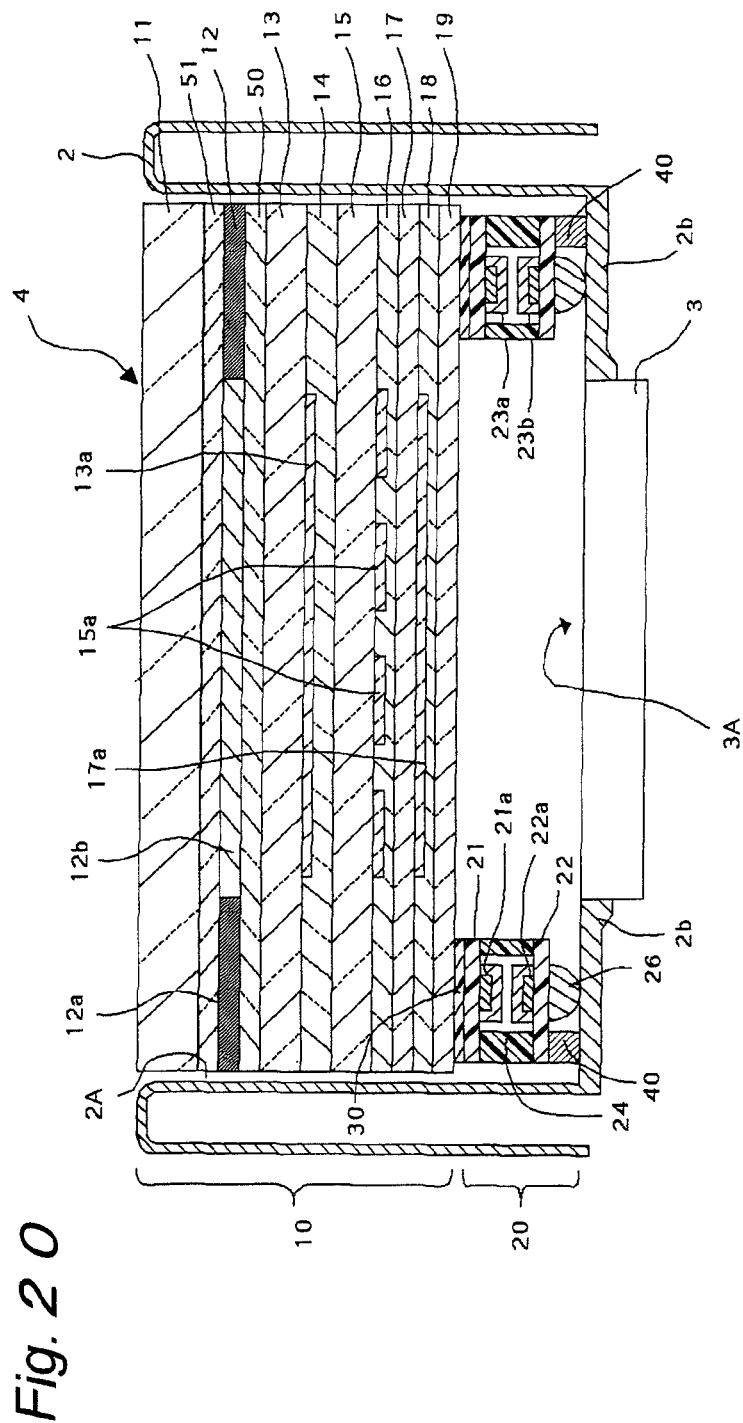
FIG. 20 is a cross-sectional view showing a mount structure of a touch input device according to a second embodiment of the present invention.

FIG. 20 is a cross-sectional view showing a mount structure of a touch input device according to a second embodiment of the present invention. The mount structure of the touch input device according to this second embodiment differs from the mount structure of the touch input device according to the first embodiment in that the gasket 40 and the pressure concentration members 26 are provided so as not to overlap with each other due to a positional relationship in which all of the pressure concentration members 26 are arranged inside the frame of the frame-shaped gasket 40, compared to the case where the gasket 40 and the pressure concentration members 26 are provided so as not to overlap with each other by providing the through holes 40a in the frame-shaped gasket 40 to house the pressure concentration member 26 in the first embodiment.

In addition, in a case where the pressure concentration members 26 are positioned outside the frame, instead of being positioned inside the frame of the gasket 40 like the second embodiment, when the pressed force is applied to the pressure sensitive sensor 20 in the thickness direction, the pressure concentration members 26 could be meaningless. This is because when the pressed force is applied to the pressure sensitive sensor 20 in the thickness direction, the touch input device 4 is bent downward, but at this time, a part outside the frame-shaped gasket 40 bonded to the support part 2 of the casing 2 is brought upward from the support part 2. Meanwhile, in the case where all of the pressure concentration members 26 are positioned in the frame of the frame-shaped gasket 40 bonded to the support part 2 of the casing 2 like the second embodiment, the pressure concentration members 26 can be prevented from being brought upward.

Figure 21:
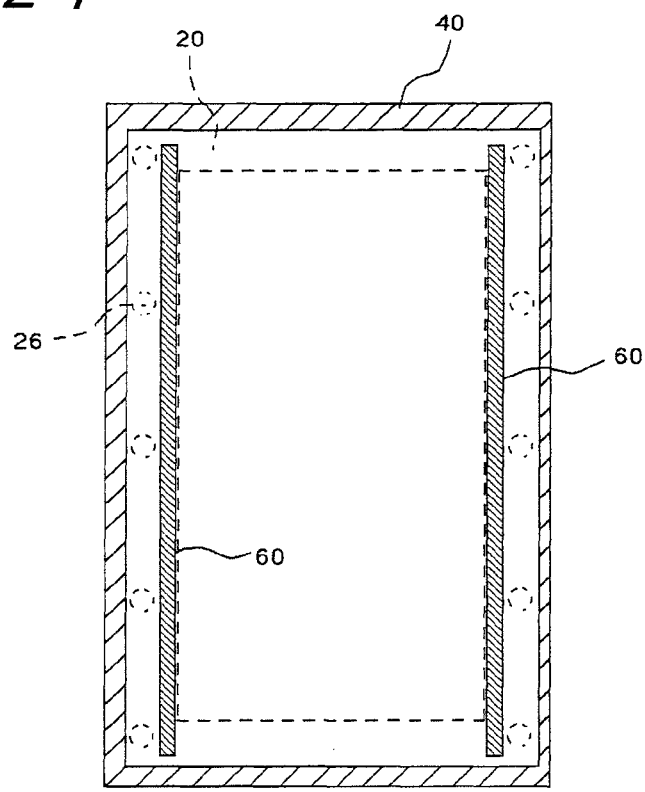
FIG. 21 is an explanatory view showing a mount variation of the touch input device according to the second embodiment of the present invention.
Figure 22:
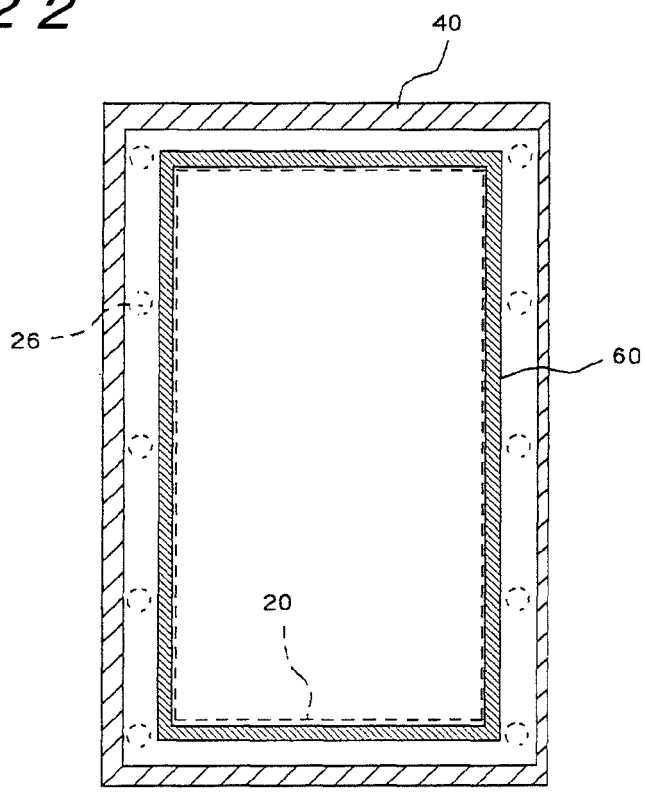
FIG. 22 is an explanatory view showing a mount variation of the touch input device according to the second embodiment of the present invention.

In addition, according to the second embodiment, an auxiliary member 60 made of the same material as that of the frame-shaped gasket 40 may be bonded between the pressure sensitive sensor 20 and the support part 2b of the casing 2 in such a manner that the pressure concentration members 26 are positioned between the auxiliary member 60 and the frame-shaped gasket 40. For example, the auxiliary member 60 may be formed into the belt shape as shown in FIG. 21, or formed into the frame shape as shown in FIG. 22.

(Evaluation Test of Pressure Measurement Accuracy)

Next, a description will be given of a test result executed to confirm that an effect of high accuracy of pressure measurement is provided in the mount structure of the touch input device in which the pressure sensitive sensor includes the pressure concentration member on the lower surface so as to correspond to the pressure sensitive ink member, the frame-shaped gasket is bonded between the pressure sensitive sensor and the support part of the casing, and the gasket does not overlap with the pressure concentration member, like the respective embodiments.

Figure 25:
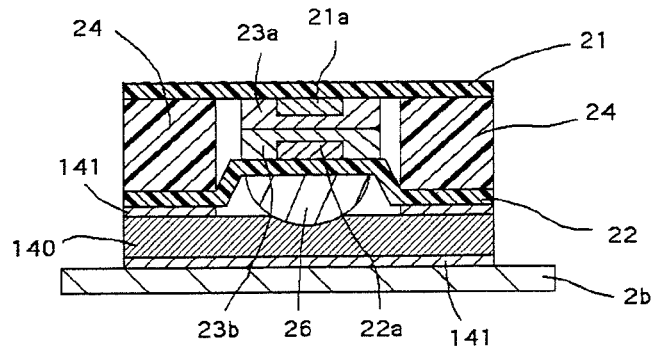
FIG. 25 is a cross-sectional view showing a mount structure of a touch input device in which a bump of a pressure sensitive sensor is arranged on a gasket.

Here, as a working example of the present invention, a sample S1 was made in such a manner that the frame-shaped gasket having the through holes to house the pressure concentration members provided in the pressure sensitive sensor (refer to FIG. 10) was attached to the back surface of the touch input device in the position which can implement the mount structure shown in FIG. 11. In addition, as a comparison example, a sample S2 was made in such a manner that a frame-shaped gasket having no through hole was attached to the back surface of the touch input device in the position which can implement the mount structure shown in FIG. 25.

Then, the samples S1 and S2 were placed on a test table instead of the casing, a weight was arranged on a center part of a glass substrate of each sample, and a resistance value was measured while a current was applied to a silver electrode. This operation was repeated several times while heaviness of the weight was changed, to measure a resistance value to the pressed force that the pressure sensitive ink member receives from the glass substrate and the weight.

Figure 23:
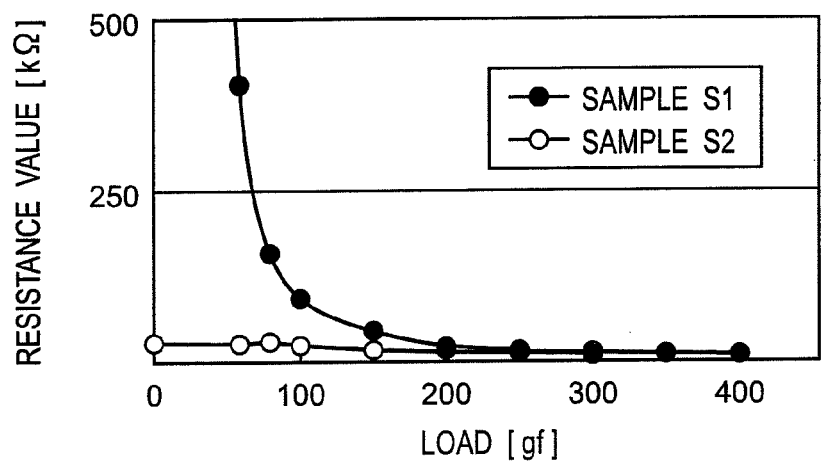
FIG. 23 is a graph showing a relationship between a resistance value and a pressed force in each of samples according to the embodiment of the present invention and a comparison example.
Figure 24:
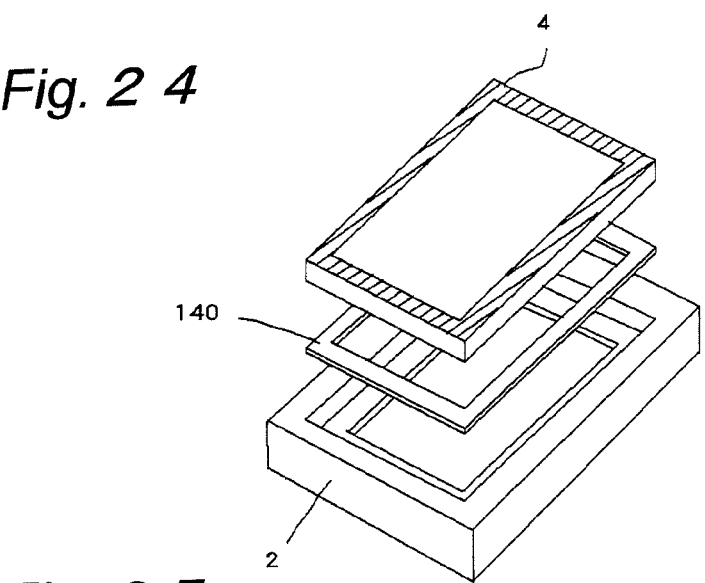
FIG. 24 is an exploded perspective view showing a mount structure of a touch input device superior in water-proofness and dust proofness with a gasket.

FIG. 23 is a graph showing a relationship between a resistance value and a pressed force in each of the samples S1 and S2.

According to the sample S2 in which the pressure concentration member and the gasket provided in the pressure sensitive sensor overlap with each other, as shown in FIG. 23, the resistance value is low even when a load is not applied, and the resistance value is hardly changed even after the pressed force is applied.

Meanwhile, according to the sample S1 in which the pressure concentration member and the gasket provided in the pressure sensitive sensor do not overlap with each other, as shown in FIG. 23, the resistance value is changed when the pressed force is about 150 gf or less.

From the above test result, it has been confirmed that the pressure measurement accuracy can be improved when the pressure concentration member and the gasket provided in the pressure sensitive sensor do not overlap with each other.

By properly combining the arbitrary embodiments of the aforementioned various embodiments, the effects possessed by the embodiments can be produced.

INDUSTRIAL APPLICABILITY

According to the mount structure of the touch input device having the pressure sensitive sensor according to the present invention, the visibility of the display part of the display device can be prevented from being lowered even when the pressure sensitive sensor is mounted, the water-proofness and the dust-proofness are excellent, and the pressure can be easily detected with high measurement accuracy, so that it can be useful in an electronic device having a touch panel, especially a portable electronic device such as a portable telephone or a game machine.

REFERENCE SIGNS LIST 1 portable telephone
2 casing
2A display window
3 display device
3A display part
4 touch input device
4A transparent window part
4B decorative region
5 input key
10 touch panel
11 transparent support substrate
12 decorative film
13 X axis detecting transparent film
13a upper transparent electrode
13b routing circuit
14 transparent adhesive layer
15 Y axis detecting transparent film
15a lower transparent electrode
15b routing circuit
16 transparent adhesive layer
17 shielding transparent film
17a shielding transparent electrode
17b routing circuit
18 transparent adhesive layer
19 hard coat film
20 pressure sensitive sensor
21 upper film
21a upper electrode
22 lower film
22a, 22b lower electrode
23a, 23b pressure sensitive ink member
24 gap holding member
25 connector
26 pressure concentration member (bump)
30 adhesive layer
40 gasket
40a through hole
41 adhesive layer
50 transparent adhesive agent
51 transparent adhesive agent
60 auxiliary member

The invention claimed is:

1. A mount structure of a touch input device comprising:
a touch input device having at least a touch panel, and a pressure sensitive sensor bonded to a lower surface of the touch panel; and
a casing dented to have a level difference to allow the touch input device to be externally fitted in, and having a concave part or an opening part for a display device, and a frame-shaped support part to support a back surface peripheral part of the touch input device, in a bottom surface thereof, wherein the pressure sensitive sensor comprises:

a first substrate;

a second substrate arranged so as to be opposed to the first substrate and bonded to the lower surface of the touch panel;

a pair of frame-shaped electrodes arranged on one or both surfaces of a surface of the first substrate opposed to the second substrate and a surface of the second substrate opposed to the first substrate, along an edge part of the first or second substrate;

a conductive pressure sensitive ink member arranged on the surface of the first substrate opposed to the second substrate or the surface of the second substrate opposed to the first substrate so as to be apart from at least one of the pair of electrodes, and so as to be along the edge part of the first or second substrate, and having electric characteristics to be changed by a pressed force applied;

a gap holding member arranged in a region between the first substrate and the second substrate, to bond the first substrate and the second substrate with its adhesiveness, and hold a gap between the pressure sensitive ink member and at least one of the pair of electrodes; and a pressure concentration member laminated and arranged in a shape of a dot on a surface opposite to the surface opposed to the second substrate, of the first substrate so as to support the pressure sensitive ink member, wherein a frame-shaped gasket is attached between the pressure sensitive sensor and the support part of the casing, and the gasket does not overlap with the pressure concentration member.

2. The mount structure of the touch input device having the pressure sensitive sensor, according to claim 1, wherein the pressure sensitive ink members are arranged in the shape of dots along two longitudinal sides of the first substrate or the second substrate, and correspond one-to-one to the pressure concentration members.

3. The mount structure of the touch input device having the pressure sensitive sensor, according to claim 1, wherein the pressure sensitive ink members are arranged in a shape of a belt along two longitudinal sides of the first substrate or the second substrate.

4. The mount structure of the touch input device having the pressure sensitive sensor, according to claim 1, wherein the frame-shaped gasket is provided with a through hole to house the pressure concentration member.

5. The mount structure of the touch input device having the pressure sensitive sensor, according to claim 4, wherein the through hole of the gasket houses two or more pressure concentration members.

6. The mount structure of the touch input device having the pressure sensitive sensor, according to claim 1, wherein all of the pressure concentration members are positioned in a frame of the frame-shaped gasket.

7. The mount structure of the touch input device having the pressure sensitive sensor, according to claim 6, wherein an auxiliary member formed of a same material as that of the frame-shaped gasket is attached between the pressure sensitive sensor and the support part of the casing so as to position the pressure concentration member between the auxiliary member and the frame-shaped gasket.

8. The mount structure of the touch input device having the pressure sensitive sensor, according to claim 1, wherein each of the first substrate, the second substrate, and the gap holding member is formed into a frame shape.

9. The mount structure of the touch input device having the pressure sensitive sensor, according to claim 1, wherein each of the first substrate and the second substrate is formed into a flat plate with a transparent material, and a transparent window part is formed in a part except for the pair of electrodes.

10. The mount structure of the touch input device having the pressure sensitive sensor, according to claim 1, wherein one of the pair of electrodes is arranged on the first substrate, the other of the pair of electrodes is arranged on the second substrate, and the pressure sensitive ink member is provided so as to cover a plurality of positions of the one or the other of the pair of electrodes.

11. The mount structure of the touch input device having the pressure sensitive sensor, according to claim 1, wherein the pair of electrodes is arranged on the first substrate so as to be spaced with each other, and the pressure sensitive ink member is arranged on the second substrate.

12. The mount structure of the touch input device having the pressure sensitive sensor, according to claim 1, wherein the pair of electrodes are arranged on the second substrate so as to be spaced to each other, and the pressure sensitive ink member is arranged on the first substrate.

* * * * *